United States Patent [19]
Paquet et al.

[11] Patent Number: 5,210,105
[45] Date of Patent: May 11, 1993

[54] CARBON BLACK-CONTAINING BIMODAL FOAM STRUCTURES AND PROCESS FOR MAKING

[75] Inventors: Andrew N. Paquet; Kyung W. Suh, both of Granville, Ohio

[73] Assignee: The Dow Chemical Company, Midland, Mich.

[21] Appl. No.: 947,855

[22] Filed: Sep. 18, 1992

Related U.S. Application Data

[63] Continuation-in-part of Ser. No. 896,025, Jun. 9, 1992, abandoned.

[51] Int. Cl.$^5$ .............................. C08J 9/12; C08J 9/14
[52] U.S. Cl. .................................. 521/99; 264/53; 264/DIG. 5; 264/DIG. 13; 106/122; 521/79; 521/81; 521/142; 521/143; 521/145; 521/146; 521/138; 521/180; 521/182
[58] Field of Search .................. 521/79, 81, 146, 180, 521/182, 145, 138, 143, 142, 99; 264/53

[56] References Cited

U.S. PATENT DOCUMENTS

| | | | |
|---|---|---|---|
| 4,098,941 | 7/1978 | Johnson | 428/218 |
| 4,455,272 | 6/1984 | Schubert et al. | 521/146 |
| 4,473,665 | 9/1984 | Martini-Vedensky et al. | 521/79 |
| 4,559,367 | 12/1985 | Hurps et al. | 521/146 |
| 4,795,763 | 1/1989 | Gluck et al. | 521/99 |
| 4,801,484 | 1/1989 | Yao et al. | 428/294 |
| 4,888,134 | 12/1989 | Kleitz et al. | 252/511 |

FOREIGN PATENT DOCUMENTS

WO9006339  6/1990  PCT Int'l Appl. .

OTHER PUBLICATIONS

McIntire and Kennedy, Styrofoam for Toro Temperature Insulation, Chem. Engineering Progress, vol. 44, No. 9, pp. 727-730.

*Primary Examiner*—Morton Foelak
*Attorney, Agent, or Firm*—J. Robert Dean, Jr.

[57] ABSTRACT

Disclosed is a bimodal, insulative, styrenic polymer foam structure comprising a foam of a styrene polymer material of greater than 50 percent by weight of styrenic monomeric units, the foam having relatively larger primary cells with a cell size range of 0.05 to 1.2 millimeters and relatively smaller secondary cells ranging in cell size from about 5 percent to about 50 percent of the average cell size of the primary cells. The primary and secondary cells constitute at least about 90 percent of the total cell volume within the foam structure. The bimodal structure has an amount of carbon black sufficient to reduce the thermal conductivity of the structure below that of a corresponding bimodal structure without carbon black. Further disclosed is a process for making the foam structure.

11 Claims, No Drawings ns and process for making

CROSS-REFERENCE TO A RELATED APPLICATION

The present application is a continuation-in-part of U.S. Ser. No. 07/896,025, filed Jun. 9, 1992 now abandonded.

BACKGROUND OF THE INVENTION

The invention relates to a bimodal, styrenic polymer foam structure having enhanced insulative properties.

A foam structure with a bimodal cell size distribution has a distribution of relatively larger primary foam cells and relatively smaller secondary foam cells. Most conventional foam structures have a unimodal or primary cell size distribution only. Various foam structures with bimodal cell distributions are seen in U.S. Pat. Nos. 4,455,272 and 4,459,367 and in European Patent Application 89114160.8.

Bimodal foam structures offer advantages over conventional unimodal foam structures. The advantages include greater toughness and enhanced insulating capability. Further, bimodal structures are typically made using water as a blowing agent component and unimodal structures typically are not. Since use of water as a blowing agent component is desirable for environmental reasons, the manufacture of bimodal structures is similarly desirable.

It would be desirable to further enhance the insulating capability of the bimodal foam structures. It would be further desirable to increase such insulating capability without detrimentally affecting the physical properties of the foam structure or detrimentally affecting its manufacture or processing.

SUMMARY OF THE INVENTION

According to the present invention, there is an insulative, bimodal, styrenic polymer foam structure comprising a) a foam of a styrenic polymer material of greater than 50 percent by weight of styrenic monomeric units and b) an amount of carbon black sufficient to reduce the thermal conductivity of the foam below that of a corresponding foam without carbon black. The foam has a bimodal cell distribution of relatively larger primary cells with a cell size range of 0.05 to 1.2 millimeters and relatively smaller secondary cells ranging in cell size from about 5 percent to about 50 percent of the average cell size of the primary cells. The primary and secondary cells constitute at least about 90 percent of the total cell volume within the foam structure. The addition of the carbon black results in a surprising and synergistic increase in insulating capability or decrease in thermal conductivity greater than that observed when carbon black is added to a conventional unimodal foam structure of substantially only primary foam cells.

Further according to the present invention there is a cushioning or insulating medium comprising a plurality of discrete foamed particles of the above-described structure.

DETAILED DESCRIPTION

The foam of the present foam structure is comprised of relatively larger primary foam cells with an average cell size range of about 0.05 to about 1.2 millimeters and relatively smaller secondary foam cells ranging in cell size from about 5 percent to about 50 percent of the average cell size of the primary cells. Cell size is determined by the optical microscopy method typically employed in the art in analyzing and characterizing bimodal foam structures. The relatively larger cells in the cell distribution are averaged to determine the average cell size of the primary cells, and the relatively smaller cells in the cell distribution are averaged to determine the average cell size of the secondary cells. The secondary cells may be situated within the cell walls or struts of the primary cells, or may be situated outside of or adjacent to the primary cells individually or in groups of two or more. A strut is a juncture of three or more cell walls. Preferably, the primary cells are generally dispersed throughout the secondary cells such that the foam of the present foam structure has a generally heterogeneous dispersion of the two cell types throughout. Additional teachings directed to plastic foams with bimodal cell distributions are seen in U.S. Pat. Nos. 4,455,272 and 4,559,367 and in European Patent Application No. 89114160.8, which are incorporated herein by reference.

Preferred bimodal foam structures have "pinholes" between a portion of the foam cells. Pinholes are microscopic holes defined within cell walls between contiguous primary cells, contiguous secondary cells, or contiguous primary and secondary cells. The pinholes do not materially affect the closed-cell nature of the foam as defined by ASTM D-2856 because the pinholes are present between only a relatively small proportion or portion of the foam cells. The pinholes are preferably present at between 1 and 30 percent by number and more preferably at between 5 and 20 percent by number of the total number of foam cells. The pinholes are believed to add a greater degree of flexibility to foams with bimodal distributions than such foams without them. The foam of the present foam structure is preferably at least 90 percent closed-cell according to ASTM D-2856. Such closed-cell foams are particularly efficacious in insulative applications.

Carbon black-containing bimodal foam structures with or without pinholes are within the scope of the present invention. Bimodal structures without pinholes are described herein as well as in the aforementioned U.S. Pat. Nos. 4,455,272 and 4,559,367 and EPO Application No. 98114160.8.

A carbon black-containing foam structure having foam with the bimodal cell distribution described above is advantageous over a carbon black-containing foam structure with a substantially primary, unimodal cell distribution because the increase in insulating capability or decrease in thermal conductivity observed for a given level of carbon black is surprisingly greater. In other words, a bimodal foam structure with carbon black will show a greater increase in insulating capability or a greater decrease in thermal conductivity over a bimodal foam structure without carbon black than a unimodal foam structure with carbon black versus a unimodal foam structure without carbon black. This disparity in increase in insulating capability or decrease in thermal conductivity upon addition of carbon black between bimodal and unimodal foam structures is surprising and unexpected. Further, a bimodal foam structure will exhibit a higher R-value (insulating capability) or lower thermal conductivity than a corresponding unimodal foam structure for a given level of carbon black. A corresponding foam structure is one substantially equivalent in average cell size according to ASTM D 3576-77 or optical microscopy in the primary cell size range and substantially equivalent in foam density.

The primary and secondary cells constitute at least about 90 percent and preferably at least 95 percent of the total cell volume within the foam structure. Cells larger than the primary cells and smaller than the secondary cells should constitute only a relatively small proportion (less than about 10 percent) of the volume displaced to ensure that the desired bimodal distribution of cell sizes will be present in the structure. Voids or cavities present in the foam structure not in the nature of a foam cell are not considered part of the total cell volume within the foam structure.

The present structure comprises greater than 50 percent and preferably at least 70 percent by weight of a styrenic polymer. The term styrenic polymer is inclusive of polymers derived from one or more alkenyl aromatic compounds such as styrene, methylstyrene, ethylstyrenes, vinyl benzene, chlorostyrenes, and bromostyrenes. Minor amounts (i.e. <5 percent by weight) of copolymerizable compounds such as $C_{1-4}$ methacrylates and acrylates, acrylic acid, methacrylic acid, maleic acid, acrylonitrile, maleic anhydride, and vinyl acetate may be incorporated into the styrenic polymer.

The styrenic polymer material may contain other thermoplastic materials as long as the styrenic polymer comprises greater than 50 weight percent and preferably at least 70 weight percent of alkenyl aromatic or styrenic monomeric units based upon the total weight of the styrenic polymer material. Suitable plastic materials may be selected from any which can be blended with the styrenic polymer and blown into a foam. Suitable plastics include polyolefins, polyvinylchloride, polystyrene, rubber-modified sytrenic polymers, cellulosic polymers, polycarbonates, polyamides, polyesters, polyvinylidene chloride, and the like. Suitable polyolefins include polyethylene, polypropylene and polybutylene. Preferred structures comprises substantially (i.e. greater than 70 percent by weight) and most preferably entirely of polystyrene, because polystyrene foam is economical, and is commonly employed as an insulating plastic foam.

The carbon black preferably comprises between about 1.0 and about 25 weight percent and more preferably between about 2 and about 10 weight percent of the foam structure based upon the weight of styrenic or non-styrenic polymers in the structure. The carbon black preferably has an average particle size between about 5 and about 250 nanometers and more preferably between about 15 and about 75 nanometers. The carbon black preferably has an average surface area between about 10 and about 1500 square meters per gram of carbon black.

The carbon black is preferably uniformly dispersed throughout the foam matrix of the present structure. The carbon black is further preferably distributed uniformly throughout the cell walls.

The present structure may contain additional additives such as pigments, fillers, antioxidants, extrusion aids, nucleating agents, stabilizing agents, antistatic agents, fire retardants, acid scavengers, or the like.

The foam component of the present structure preferably has density of about 16 to about 80 kilograms per cubic meter. The foam component further preferably has an average cell size of about 0.05 to about 1.2 millimeters.

The present foam structure is generally formed by melting and mixing the styrenic polymer itself or with other polymers if present to form a plastic melt, incorporating a blowing agent into the plastic melt to form a foamable gel, and extruding the foamable gel through a die to form the foamed structure. During melting and mixing, the polymers are heated to a temperature at or above the glass transition temperature and preferably above the melting point of the polymer. Melting and mixing of polymers and any additives is accomplished by any means known in the art such as with an extruder, mixer, or blender. The carbon black may be dry-blended straight with the polymer or in the form of a carbon black-polymer concentrate. Likewise, the blowing agent, including water, is incorporated or blended into the plastic melt by any of the same above-described means. The blowing agent is blended with the plastic melt at an elevated pressure sufficient to prevent substantial expansion of the resulting plastic gel or loss of generally homogeneous dispersion of the blowing agent within the gel. The blowing agent is incorporated into the melt in a weight proportion of between about 1 to about 30 parts and preferably from 3 to 15 parts per hundred parts of the polymer to be expanded. The foam gel is preferably passed through a cooler or cooling zone to lower the gel temperature to an optimum foaming temperature. For polystyrene, typical optimum foaming temperatures range from 110° C. to 135° C. The cooled gel is then passed through the die into a zone of reduced pressure to form the foam structure.

Water is incorporated into the polymer melt or polymer feedstock in an amount sufficient to form the bimodal foam structure. Water preferably comprises at least about 1 weight percent and more preferably at least about 3 weight percent based upon the total weight of the blowing agent. Water may be incorporated into the polymer melt or polymer feedstock in the form of a water-carrying or water-generating solid, liquid, or vapor or gas.

The prior art is instructive concerning methods of making bimodal foam structures useful in the present invention. U.S. Pat. No. 4,559,367 relates a process for making a bimodal foam structure by incorporating finely-divided, water-containing organic vegetable matter into a polymer feedstock, melting the resulting solid mixture, incorporating a volatile foaming agent into the solid mixture melt to form a foamable mixture, and extruding the foamable mixture through a die to form the foam structure. U.S. Pat. No. 4,455,272 relates a process for making a bimodal foam structure by injecting water and a physical blowing agent into a polymer melt and extruding the resulting mixture through a die to form the structure. EPO Application No. 89114160.8 relates a process for making a bimodal foam structure by incorporating into the polymer feedstock a fine, water-absorbing mineral powder, melting the resulting solid mixture, incorporating a volatile foaming agent into the solid mixture melt to form a foamable mixture, and extruding the foamable mixture through a die to form the foam structure.

The blowing agent utilized to prepare the preferred embodiment of the present structure (with pinholes) comprises at least about 3 weight percent water based upon the total weight of the blowing agent. The water fraction of the blowing agent must also comprise at least about 0.3 parts per hundred by weight based upon the weight of the styrenic and non-styrenic polymers in the present structure. The necessary water fractions for the preferred embodiment refer to blowing agent which is incorporated in liquid, vapor, or gaseous form directly into the plastic or polymer melt by external means such as injection into an extruder, mixer, or blender and not by water-carrying or water-generating solids incorporated into the plastic or polymer melt as in the prior art. The use of proper fractions of water in the blowing agent added to the polymer melt externally in liquid, vapor or gaseous form and proper selection of foaming temperature result in a foam structure having the desired bimodal cell size distribution with pinholes. The preferred embodiment does not preclude the incorporation of water-carrying or water-generating solids into the polymer melt, but water incorporated by means of such solids is not believed to be critical to pinhole formation; thus, water incorporated by means of such solids is not considered in calculation of proper water fractions of blowing agents incorporated into the polymer melt in liquid or vapor form for the preferred embodiment. Proper selection of foaming temperature ensures a fine, homogeneous dispersion of water in the foamable gel.

Blowing agents which may be utilized in combination with water include inorganic agents, volatile organic agents, and chemical agents which decompose into a gas or other byproducts. Suitable gaseous blowing agents include, but are not limited to nitrogen, carbon dioxide, air, krypton, and argon. Suitable volatile organic agents include halogenated and nonhalogenated aliphatic hydrocarbons. Suitable nonhalogenated aliphatic hydrocarbons include $C_{1-9}$ alkenes and alkanes such as n-butane, isobutane, n-pentane, ethane, propane, isopentane, n-hexane, and isohexane. Suitable halogenated aliphatic hydrocarbons include methyl chloride, ethyl chloride, perfluoromethane, chlorotrifluoromethane, dichlorodifluoromethane, trichlorofluoromethane, difluoromethane, perfluoroethane, 1-chloro-1,1-difluoroethane, 1,1,1,2-tetrafluoroethane, 1,1,1-trifluoroethane, pentafluoroethane, chlorotetrafluoroethane, 2-chloro-1,1,1,2-tetrafluoroethane chloropentafluoroethane, dichlorotetrafluoroethane, trichlorotrifluoroethane, perfluoropropane, chlorheptafluoropropane, dichloropropane, difluoropropane, dichlorohexafluoropropane, perfluorobutane, chlorononafluorobutane, and perfluorocyclobutane. Suitable chemical blowing agents include azodicarbonamide, azodiisobutyronitrile, benzenesulfonhydrazide, 4,4-oxybenzene sulfonylsemicarbazide, p-toluene sulfonyl semicarbazide, barium azodicarboxylate, N,N'-dimethyl-N,N'-dinitrosoterephthalamide, and trihydrazino triazine.

Preferred blowing agents are those using a combination of water and an inorganic blowing agent such as nitrogen, carbon dioxide, or argon. A most preferred blowing agent comprises water and carbon dioxide. The blowing agent comprises an amount of water sufficient to form the desired bimodal structure. The blowing agent preferably comprises from about 1 to about 80 weight percent water, more preferably from about 3 to about 80 weight percent water, and most preferably between about 5 and about 60 weight percent water based upon the total weight of the blowing agent.

Though the preferred process for making the present structure is an extrusion process, it is understood that the above structure may be formed by expansion of beads, which may be molded at the time of expansion to form structures of various shapes. Insulating panels formed from molded, expandable beads are commonly referred to as bead board.

The present foam structure may be used to insulate a surface by fashioning the structure in the form of a panel and applying it to the surface. Such panels are useful in any conventional insulating applications such as roofing, buildings, refrigerators, etc.

According to the present invention, the present foam structure may be formed into a plurality of discrete foamed particles for conventional loose-fill cushioning and packaging applications, or may be ground into scrap for use as blown insulation or incorporation into evacuated or unevacuated bags for insulation purposes.

The following are examples of the present invention, and are not to be construed as limiting. Unless otherwise indicated, all percentages, parts, or proportions are by weight.

EXAMPLES

Foam structures according to the present invention were prepared and evaluated for thermal conductivity and/or insulating capacity (R-value). All percentages and parts are by weight unless otherwise noted.

EXAMPLE 1

Foam structures were made with an apparatus comprising a 2 ½ inch (6.4 centimeter) extruder, a mixer, a cooler, and a die in series. Polystyrene resin having a molecular weight of about 200,000 as measured by size exclusion chromotography was fed to the extruder along with 10 percent carbon black, 0.05 pph magnesium oxide, 0.05 pph calcium stearate, and 1.0 pph hexabromocyclododecane by weight to form a polymer melt. A mixture of 1.5 pph water and 4 pph carbon dioxide was added to the polymer melt in the mixer to form a foamable gel. The foamable gel was cooled to 125° C. and extruded through the die and expanded between substantially parallel forming plates. The die pressure was 1100 pounds per square inch (psig). The foam structure had primary cells of 0.2 millimeter (mm) in size and a density of 2.3 pounds per cubic foot (pcf) (36 kilograms per cubic meter ($kg/m^3$)). The foam had a bimodal cell structure with secondary cells in struts and cell walls wherein the secondary cells were about one-fifth the size of the primary cell size. Further, the foam structure had pinholes between foam cells and the interior of the foam. The K-factor or thermal conductivity of the foam at 180 days of aging was 0.202 Btu-in/F°-$ft^2$-hr.

EXAMPLE 2

Using the apparatus and process of Example 1, 7 percent by weight carbon black, 0.05 parts per hundred calcium stearate, 0.05 parts per hundred magnesium oxide, and 0.2 parts per hundred linear low density polyethylene per hundred parts polystyrene resin (density=0.915–0.93 grams/cubic centimeter; melt index 2.0–2.5) were blended in the extruder to form a polymer melt. A blowing agent mixture of 0.5 parts per hundred water and 4 parts per hundred carbon dioxide were added to the polymer melt to form a foamable gel. The foamable gel was cooled to 128° C., and conveyed through a die to equal at atmospheric pressure between parallel forming plates. The die pressure was 1200 psig. The foam structure had a bimodal cell distribution with an average primary cell size of 0.22 mm. The foam structure had internally connected pinholes between cells, and had secondary cells in the struts and cell walls. Foam structure density was 3.2 pcf (with skins).

The K-factor (Btu-in/F°-ft²-hr) after 3 days of aging was 0.212, which corresponded to R/inch of 4.7.

While embodiments of the foam structure of the present invention have been shown with regard to specific details, it will be appreciated that depending upon the manufacturer's desires, the present invention may be modified by various changes while still being fairly within the scope of the novel teachings and principles herein set forth.

What is claimed is:

1. An insulative styrenic polymer foam structure, comprising: a foam of a styrenic polymer material of greater than 50 percent by weight of styrenic monomeric units, the foam having relatively larger primary cells with an average cell size range of 0.05 to 1.2 millimeters and relatively smaller secondary cells ranging in cell size from about 5 percent to about 50 percent of the average cell size of the primary cells, the primary and secondary cells displacing at least about 90 percent of the total cell volume within the foam structure, the foam having an amount of carbon black sufficient to reduce the thermal conductivity of the foam below that of a corresponding foam without carbon black.

2. The structure of claim 1, wherein a portion of the secondary cells are located partially or completely within the cell walls or struts of the primary cells.

3. The structure of claim 1, wherein the cell size range is 0.10 to 0.50 millimeters for the primary cells.

4. The structure of claim 1, wherein the carbon black has a particle surface area of about 10 to about 1500 square meters per gram.

5. The structure of claim 1, wherein the carbon black comprises from about 1.0 and about 25 weight percent carbon black based upon the weight of the styrenic polymer material.

6. The structure of claim 1, wherein the carbon black comprises from about 2.0 and about 10 weight percent carbon black based upon the weight of the styrenic polymer material.

7. The structure of claim 1, wherein the foam is at least 90 percent closed cell.

8. The structure of claim 1, wherein the foam further comprises a blowing agent comprising at least about 3 weight percent water based upon the total weight of the blowing agent, the water comprising at least about 0.3 parts per hundred by weight based upon the weight of the styrenic polymer material.

9. A cushioning or insulating medium, comprising a plurality of discrete foamed particles of the structure of claim 1.

10. The structure of claim 1, wherein the primary and secondary cells have pinholes between 1 and 30 percent by number of the total number of primary and secondary cells.

11. The structure of claim 1, wherein the primary and secondary cells have pinholes between 5 and 20 percent by number of the total number of primary and secondary cells.

* * * * *